UNITED STATES PATENT OFFICE.

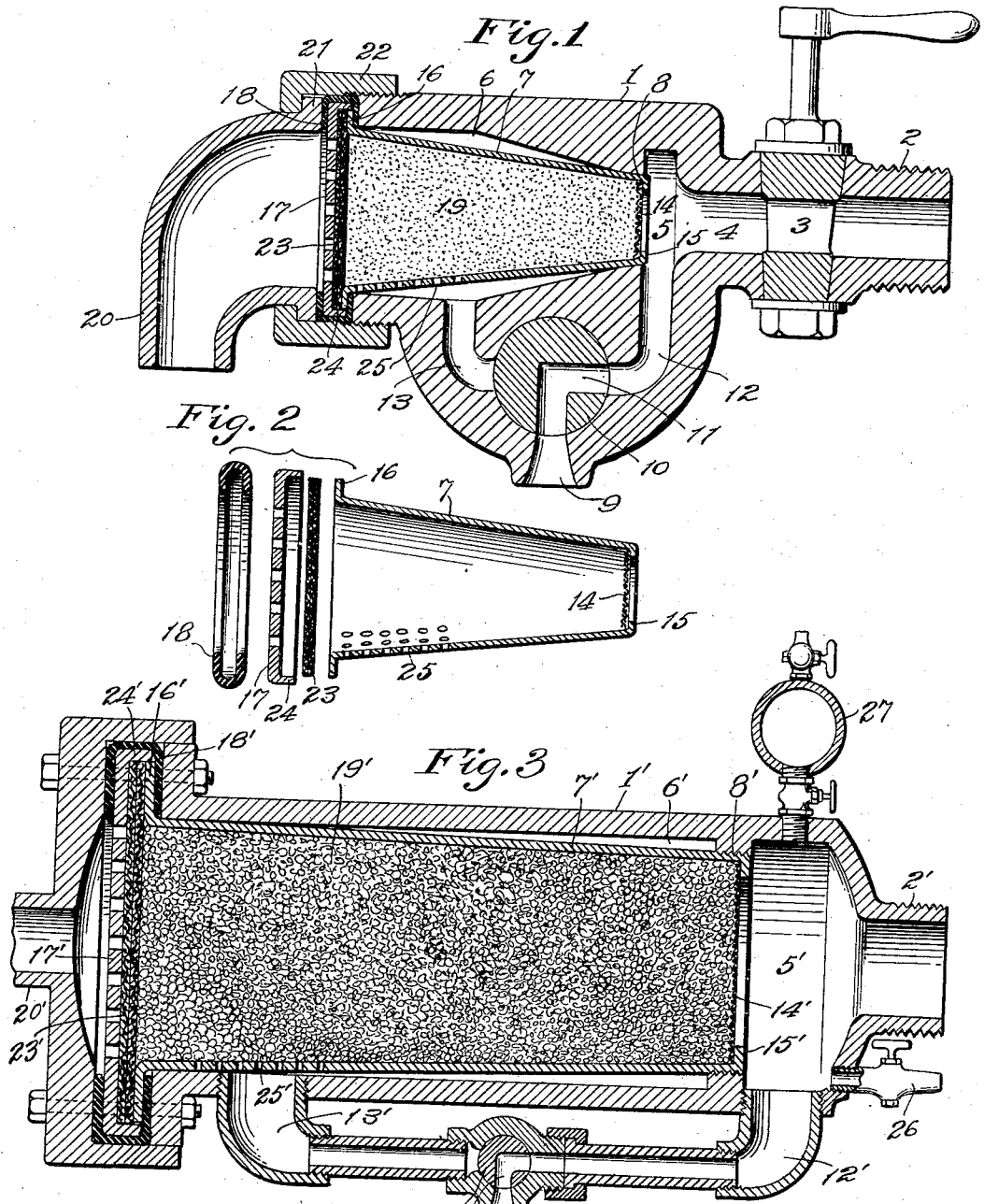

GEORGE W. DURBROW, OF LOS ANGELES, CALIFORNIA.

FILTERING DEVICE.

966,181.  Specification of Letters Patent.  Patented Aug. 2, 1910.

Application filed March 30, 1908. Serial No. 424,096.

*To all whom it may concern:*

Be it known that I, GEORGE W. DURBROW, a citizen of the United States, residing at Los Angeles, in the county of Los Angeles and State of California, have invented new and useful Improvements in Filtering Devices, of which the following is a specification.

This invention is applicable in various forms, and may be embodied in domestic filters capable of application as a faucet directly to the service pipes, or it may be embodied in large form for filtration plants for municipal, private, or other purposes.

The object of this invention is to provide a superior filter of simple construction that may be readily installed and may be readily cleansed from time to time by flushing with water from the supply pipe, or by ready removal of the parts for the purpose of recleansing, as occasion may demand.

The accompanying drawings illustrate the invention.

Figure 1 is an axial section of a device embodying the invention as the same may be applied as a filtering faucet. The valves are adjusted for flushing the supply-chamber. Fig. 2 is an axial section of portions of Fig. 1 detached. Fig. 3 is an axial section of a filter constructed in accordance with this invention in a form applicable for filtration-plants.

1 is the main section or body of the filter-casing provided with a neck 2 which may be screwed into the service-pipe, not shown, and forms the inlet of the filter. Said neck may be provided with a valve 3 which controls the inlet 4 to the supply-chamber 5 of the body 1.

6 is a chamber to contain a filter-shell 7. Said chamber is provided at its inner end with a seat 8 for the inner end of the filter-shell 7 to form a water-tight joint between the supply-chamber 5 and the filter-chamber 6 when the shell 7 is inserted into place.

9 designates a drainage outlet controlled by valve 10 and communicating through a drainage way 11 in said valve with a passage 12 from the supply-chamber 5 and with a passage 13 from the filter-shell chamber 6, the valve 10 being constructed to cut off both or either one of the passages, as may be desired, for the purpose of either causing a flow directly from the supply-chamber 5 to the outlet 9, or directly from the filter-shell-chamber 6 to the outlet 9.

The valve-shell 7 may be constructed of a tapering tube provided at one end with a foraminated portion 14 which may be formed in any suitable manner, as a fine screen of closely-woven wire-cloth held by an inwardly-bent lip or flange 15, as shown. The other end of the shell 7 may be provided with an outwardly-extending flange 16 to which a perforated disk 17 forming a cap may be attached by a rubber band 18 which may be U-shaped in cross-section, so as to embrace the rims of the cap and flange to hold the same together and also to form a gasket for both the flange and the rim of the disk.

19 designates filtering material inside the filter-shell 7. Such material may be of any substance deemed desirable by the constructor. In the case of the filtering faucet shown in Fig. 1, said filtering material may be made of absorbent cotton or it may be of fine sand, charcoal, or both, or any other filtering substance that may be deemed advisable. In the case of larger filtering plants the filter material may be of gravel and charcoal, or any other substance or substances suitable for the purpose.

20 designates the discharge spout provided with a flange 21 and adapted to be held in place by a union 22 screwed upon the end of the body 1, thus to compress the flange 21 of the spout against the U-shaped gasket 18, thereby to force the same against the end of the body 1 to form a water-tight joint.

23 designates a filter diaphragm formed of a plurality of sheets of woven fabric. Two or more sheets may be used for this purpose. In the drawings two sheets are shown, the same being placed in the cup-shaped perforated disk 17 which has a collar 24 to hold the sheets 23 from displacement.

When the hollow rubber gasket 18 is stretched around and over the flange 16 and over the filter device formed by the perforated disk 17 and the diaphragm 23, then said filter device will be applied to the end of the filter-body 1 and the spout 20 will be brought into a position in which the union 22 may be screwed home, thus to hold the filtering device water-tight against the end of the body 1.

The filter-shell 7 is provided with a perforated or foraminous portion 25 adjacent the drainage passage 13, so that water passing through the filter material 18 may be allowed to flow through the drainage passage 13 by turning the valve 10 so that the passage therethrough will register with the way 13 and with the outlet 9. When this is done, water admitted to the supply-chamber 5 will pass through the filter material 19 with considerable rapidity to find egress through the outlet 9, and the water thus flowing therethrough will tend to cut, cleanse and remove the accumulations which may have formed in the filtering material.

When it is desired to flush the face of the diaphragm 14 this may be done by turning the valve 10 to communicate between the drainage-way 11 and the outlet 9, so that the water may flow forcibly across and through the chamber, thus washing the face of the diaphragm and carrying the impurities off through the outlet 9.

Corresponding parts in the several views are marked with corresponding characters, those occurring in Fig. 3 being distinguished from those in the other views by an index.

26 designates a cock to which a pipe or hose, not shown, may be attached for the introduction of an antiseptic fluid, vapor, liquid, steam, or gas, to sterilize the interior of the filter.

27 designates an air-valve to allow escape of air from the supply-chamber 5.

The seat 8 in the smaller-sized filters may be ground to fit the end of the filter-shell 7 so as to form a water-tight joint between the supply-chamber 5 and the filter-shell-chamber 6. In the larger forms the filter-shell-seat is preferably screw-threaded as shown at 8′ in Fig. 3, and the end of the filter-shell is screwed thereinto, thus to form a tight joint between the chambers 5′ and 6′.

In ordinary practice the drainage-valve 10 will be turned so as to close both of the passages 12 and 13, and in the case of the filtering faucet the valve 3 may be turned into the position shown in Fig. 1 whenever it is desired to draw filtered water from the spout 20.

The filter shown in Fig. 3 may be connected with pipes provided with valves, not shown, to control the flow of water therethrough.

It is to be understood that the proportions of the various parts may be varied within the discretion of the constructor.

I claim:—

1. A filter comprising a hollow body provided with an inlet, a seat for a filter-shell, a receiving chamber on one side of said seat and a filter-shell-chamber on the other side of said seat, an outlet communicating with said chambers, and a valve to close such communication and to open communication between the outlet and said chambers alternately, a filter-shell in the filter-shell-seat and chamber provided with an outlet and also provided with foraminous portions communicating with the receiving chamber and the filter-shell-chamber respectively, filtering material in said shell, a permeable retainer for said filtering material at the outer end of the shell, and outlet means to hold said retainer and shell in said body.

2. A filter comprising a hollow body provided with an inlet, a seat for a filter-shell, a receiving-chamber on one side of said seat, and a filter-shell-chamber on the other side of said seat; a tapered filter-shell in the filter-shell-chamber with its small end fitting said seat and with its large end closing the opposite end of the filter-shell-chamber, the central portion of the filter-shell-chamber being larger than the filter-shell, and there being perforations through the central portion of the filter-shell; a three-way valve having two inlets and an outlet, means forming a passage leading from the receiving chamber through one inlet to the valve, and means forming a passage leading from the filter-shell-chamber through the other inlet of the valve; so that by manipulating the valve one way unfiltered water may be secured; by manipulating the valve another way the filter-shell may be drained; and by manipulating the valve a third way both passages may be closed.

3. A filter comprising a hollow body provided with an inlet, a seat for a filter-shell, a receiving-chamber on one side of said seat, and a filter-shell-chamber on the other side of said seat; a tapered filter-shell in the filter-shell-chamber with its small end fitting said seat and with its large end closing the opposite end of the filter-shell-chamber, the central portion of the filter-shell-chamber being larger than the filter-shell, and there being perforations through the central portion of the filter-shell; a valve, an outlet leading from the receiving chamber to the valve, and an outlet leading from the filter-shell-chamber to the valve.

4. The combination with a hollow body having an inlet and a filter-shell-chamber, of a filter-shell provided with filtering material and mounted in said chamber, and also provided with a foraminous portion at the inlet end and with a flange at the opposite end, a filter diaphragm at the flanged end, a permeable cap at the flanged end, a hollow gasket embracing the cap and flange, discharge means, perforations in the shell for drainage purposes, and means for clamping the discharge means to the body and against the gasket.

5. The combination with a hollow body having an inlet and a filter-shell-chamber, of a tapering filter-shell mounted in said chamber and provided with a foraminous portion at said inlet, a removable foraminous closure on the opposite end of said filter-chamber, perforations in said shell for drainage purposes, and means for holding said closure and said filter-chamber in place.

In testimony whereof, I have hereunto set my hand at Los Angeles, California, this 17th day of February, 1908.

GEORGE W. DURBROW.

In presence of—
 JAMES R. TOWNSEND,
 M. BEULAH TOWNSEND.